United States Patent
Mimura et al.

(10) Patent No.: US 6,522,637 B1
(45) Date of Patent: Feb. 18, 2003

(54) SYSTEM AND METHOD FOR ALLOCATING A CARRIER WAVE FREQUENCY OF ONE CHANNEL BETWEEN TWO CARRIER WAVE FREQUENCIES OF ANOTHER CHANNEL

(75) Inventors: Yukie Mimura, Tokyo (JP); Tomoki Osawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/246,848

(22) Filed: Feb. 9, 1999

(30) Foreign Application Priority Data

Feb. 9, 1998 (JP) .......................................... 10-027128

(51) Int. Cl.[7] ........................... H04B 7/208; H03D 3/22
(52) U.S. Cl. ..................... 370/319; 370/334; 370/341; 370/344; 370/480; 375/308; 375/323
(58) Field of Search ................................ 370/344, 319, 370/341, 323, 334, 370, 480; 375/130, 137, 146, 147, 308, 315, 323, 329

(56) References Cited

U.S. PATENT DOCUMENTS

| | | | |
|---|---|---|---|
| 4,267,600 A | * 5/1981 | Campbell | 455/115 |
| 4,587,661 A | * 5/1986 | Schiff | 375/115 |
| 5,077,728 A | * 12/1991 | Kaminow | 359/124 |
| 5,371,780 A | * 12/1994 | Amitay | 379/58 |
| 5,566,168 A | * 10/1996 | Dent | 370/50 |
| 5,577,024 A | * 11/1996 | Malkamaki et al. | 370/18 |
| 5,633,898 A | * 5/1997 | Kishigami et al. | 375/344 |
| 5,790,527 A | * 8/1998 | Janky et al. | 370/330 |
| 5,930,243 A | * 7/1999 | Parish et al. | 370/334 |
| 6,069,885 A | * 5/2000 | Fong et al. | 370/336 |
| 6,240,077 B1 | * 5/2001 | Vuong et al. | 370/330 |
| 6,275,506 B1 | * 8/2001 | Fazel et al. | 370/478 |
| 6,295,272 B1 | * 9/2001 | Feldman et al. | 370/210 |
| 2001/0048679 A1 | * 12/2001 | Czerwiec et al. | 370/352 |

FOREIGN PATENT DOCUMENTS

| | | |
|---|---|---|
| JP | 54-44421 | 4/1979 |
| JP | 56-98957 | 8/1981 |
| JP | 63-253738 | 10/1988 |
| JP | 3-254239 | 11/1991 |
| JP | 8-331080 | 12/1996 |

OTHER PUBLICATIONS

Culverhouse et al, "40–MHz All–Fiber Acoustooptic Frequency Shifter", IEEE Photonics Technology letters, vol. 8, No. 12, Dec. 1996.*

* cited by examiner

*Primary Examiner*—Hassan Kizou
*Assistant Examiner*—Afsar M. Qureshi
(74) *Attorney, Agent, or Firm*—Foley & Lardner (57) ABSTRACT

A transmission apparatus and method for a frequency division multiple access (FDMA) system that uses FSK (frequency shift keying) or OOK (On/Of keying) modulation. The apparatus includes a plurality of FSK (or OOK) modulators, each of which allocates a maximum frequency shift value in the FSK (or OOK) modulation for data to be transmitted for a respective one of a plurality of channels of the FDMA system. The apparatus also includes a frequency converter for converting modulated signals output from each of the FSK (or OOK) modulators to carrier wave frequencies, and for combining the frequency-converted signals by allocating a carrier wave frequency of at least one of the plurality of channels to be between two carrier wave frequencies of another of the plurality of channels. The apparatus further includes an amplifier for amplifying the power of signal output from the frequency converter.

12 Claims, 12 Drawing Sheets

SYSTEM AND METHOD FOR ALLOCATING A CARRIER WAVE FREQUENCY OF ONE CHANNEL BETWEEN TWO CARRIER WAVE FREQUENCIES OF ANOTHER CHANNEL

BACKGROUND OF THE INVENTION

1. Field of the Invention

The present invention relates to a radio communication system and a channel allocating method in an FDMA (Frequency Division Multiple Access) system. More specifically, the present invention is directed to a radio communication system including a radio signal transmitter and a receiver, and a channel allocating method in the FDMA system in which an FSK (Frequency Shift Keying) modulation is employed.

2. Description of the Related Art

As a multiple access system where a plurality of users perform radio communications at the same time in the same field, the FDMA (Frequency Division Multiple Access) system and the TDMA (Time Division Multiple Access) system are frequently used. Among these systems, the FDMA system is such a system that a radio frequency band assigned to the system is subdivided into a plurality of channels, and radio channels of the respective users are set to radio frequencies different from each other with respect to each of the users. A predetermined frequency interval is provided between the multiplexed channels, so that no interference occurs between the channels. To increase a total number of channels available for multiplexing in an assigned frequency band, it is required to employ such a modulation system capable of reducing an occupied frequency bandwidth per channel as narrow as possible.

The FSK (Frequency Shift Keying) modulation is such a modulation system for varying a frequency of a modulating carrier wave in accordance with a content of data to be transmitted. An occupied frequency bandwidth of an FSK-modulated signal is determined based on a difference between a maximum frequency of a modulating carrier wave and a minimum frequency thereof, namely a magnitude of a maximum frequency shift. The larger the maximum frequency shift becomes, the more the interference between the carrier waves can be suppressed. As a result, the quality of speech communication can be improved.

Figure 12:
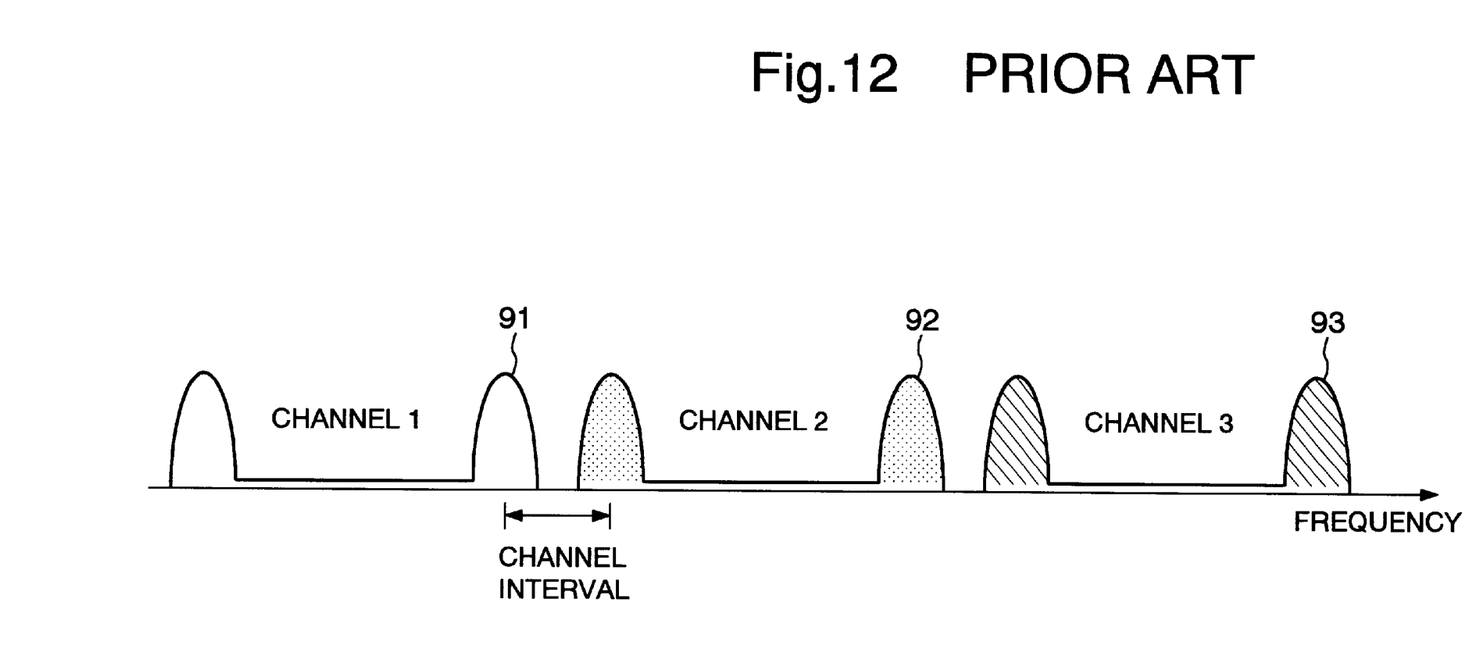
FIG. 12 is a power spectrum in the case that the conventional channel allocating method is employed.

However, there is a problem that when the maximum frequency shift is excessively increased, since the occupied frequency bandwidth of the modulated signal is widened, a total number of channels to be multiplexed is reduced. In particular, as shown in FIG. 12, when the maximum frequency shift is increased, the bandwidth per 1 channel is increased, so that the number of dividing frequencies to be accommodated in the assigned radio frequency band is reduced, and the multiplexing degrade is decreased.

As a consequence, according to the present invention, a channel allocating method with a high frequency utilizing efficiency is provided in which in the FDMA system, while a maximum frequency shift by the FSK modulation is set to a large value, and also a maximum frequency shift by the OOK (ON/OFF Keying) modulation is set to a large value, a carrier wave frequency of another channel is allocated between carrier wave frequencies of a certain channel.

SUMMARY OF THE INVENTION

The present invention is featured by such a channel allocating method used to a frequency division multiple access (FDMA) system by an FSK (Frequency Shift Keying) modulation, wherein: while a maximum frequency shift in the FSK modulation is increased, more than one carrier wave frequencies of other channels are allocated between carrier wave frequencies of a certain channel. Also, the present invention is applied for an OOK (ON/OFF Keying) modulation by similar configuration.

Also, the present invention is featured by such a transmitter apparatus used to a frequency division multiple access (FDMA) system by an FSK (Frequency Shift Keying) modulation, wherein: while a maximum frequency shift in the FSK modulation is increased, more than one carrier wave frequencies of other channels are allocated between carrier wave frequencies of a certain channel. Also, the present invention is applied for an OOK (ON/OFF Keying) modulation by similar configuration.

Also, the present invention is featured by such a receiver apparatus used to a frequency division multiple access (FDMA) system by an FSK (Frequency Shift Keying) modulation, wherein: while a maximum frequency shift in the FSK modulation is increased, a reception signal is received in which more than one carrier wave frequencies of other channels are allocated between carrier wave frequencies of a certain channel. Also, the present invention is applied for an OOK (ON/OFF Keying) modulation by similar configuration.

Further, the present invention is featured by such a channel allocating method used to a frequency division multiple access (FDMA) system by an FSK (Frequency Shift Keying) modulation, wherein: while a maximum frequency shift in the FSK modulation is increased, more than one carrier wave frequencies of other channels are allocated between carrier wave frequencies of a certain channel, and also an interval of the channels is determined by a magnitude of a maximum Doppler frequency. The present invention is also applied for an OOK (ON/OFF Keying) modulation by similar configuration.

DETAILED DESCRIPTION OF PREFERRED EMBODIMENTS

Preferred embodiments according to the present invention will be described in the following with reference to accompanying drawings.

1. First Embodiment

Figure 1:
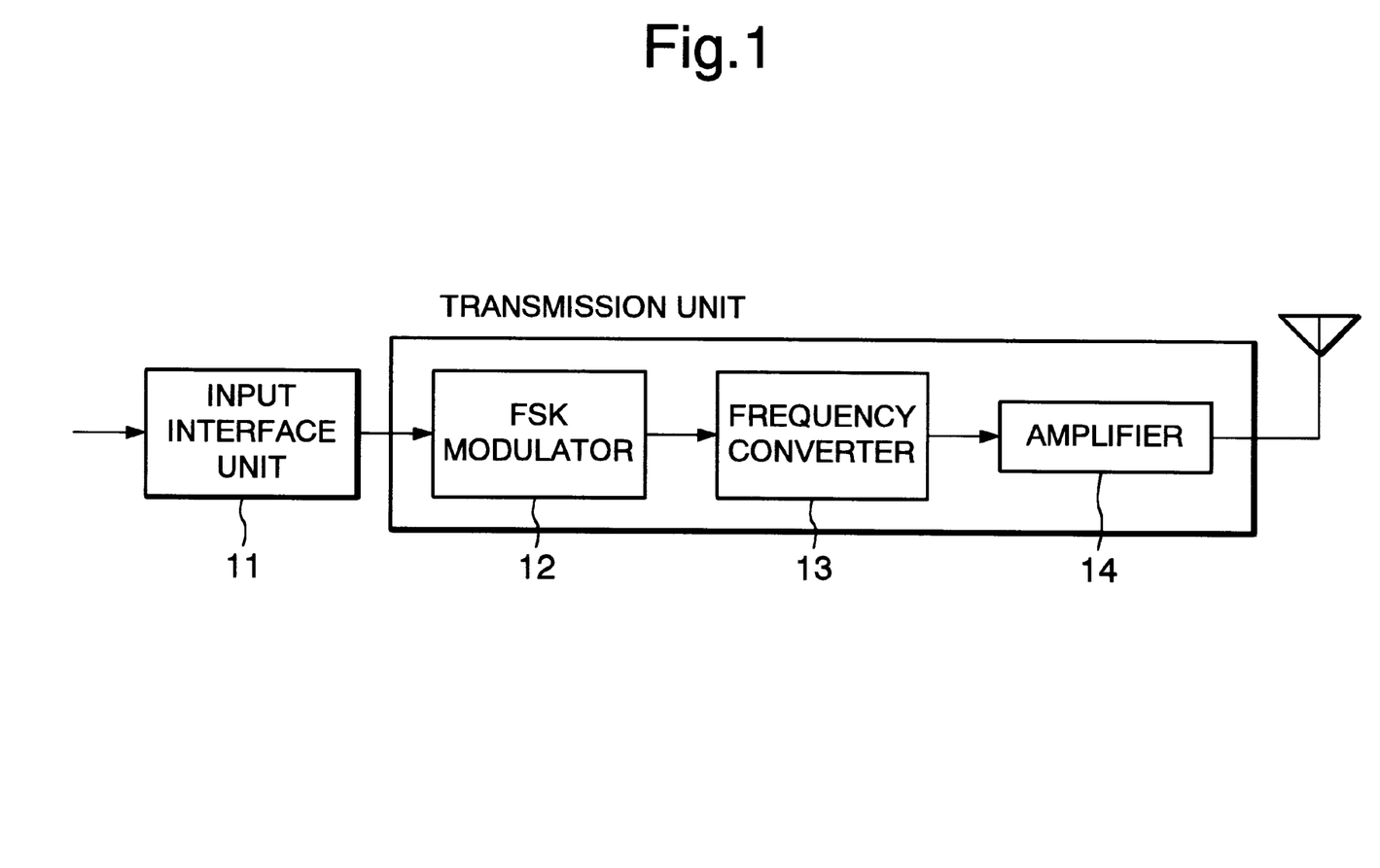
FIG. 1 is a block diagram showing an arrangement of a transmission apparatus according to a first embodiment of the present invention.

FIG. 1 is a functional block diagram for showing a transmission apparatus used in a mobile station according to a first embodiment of the present invention. Referring to FIG. 1, the transmission apparatus is arranged by an input interface unit 11, an FSK modulator 12, a frequency converter 13, and an amplifier 14.

Data to be transmitted is entered via the input interface unit 11 to the OK modulator 12. In the FSK modulator 12, the carrier waves are frequency-modulated by shifting carrier frequencies of the respective data to be transmitted in accordance with the content of the data ("1" or "0") and a multiplexing degree. The frequencies of the carrier waves are set in such a mariner that a maximum frequency shift becomes a sufficiently large value, and power spectra of the carrier waves are separated from each other as far as possible in order that interference occurred between the carrier waves is reduced. In the frequency converter 13, the frequency conversion is carried out for the base band data to a radio frequency band in signals In this frequency conversion into the radio frequency band, the frequencies of the respective channels are set in such a manner that a carrier wave frequency of another channel can be allocated between carrier wave frequencies of a certain channel. By employing this channel allocating method, a larger number of channels can be multiplexed within the assigned frequency band. The power of frequency-convert, signal is amplified in the amplifier 14 for radio transmission, and then the power-amplified signal is supplied to the radio transmission path.

Operations of the first embodiment of the present invention will be described in detail with reference to FIG. 1.

The data to se transmitted is entered via the input interface unit 11 to the FSK modulator 12. As an example, a description is made for the FSK modulation case that two carrier wave frequencies are used.

In the FSK modulation, the carrier waves are frequency-modulated by shifting the respective carrier frequencies with a value in accordance with the content of the input data and the multiplexing degree. For instance, since a VCO (voltage-controlled oscillator) whose oscillation frequency is varied in response to an applied voltage is employed, carrier wave frequencies "fa" and "fag"' corresponding to the content of input data ("0" or "1") may be obtained by the FSK modulator 12. The values of the carrier frequencies "fa" and "fa"' are set in such a manner that a difference between these frequencies, namely a maximum frequency shift can become sufficiently large.

In the case that the maximum frequency shift is large, the power spectrum of the modulated signal owns such a shape that peeks appear in the vicinity of the carrier wave frequencies fa and fa'. The larger this maximum frequency shift is, the farther the frequency difference between two peaks is separated, so that the interference occurred between the carrier waves can be lowered. The FSK modulator 12 modulates the input signal from the input interface unit 11 to the predetermined carrier frequencies fa and fa' based upon the content of the data ("0" or "1").

In the frequency converter 13, the modulated signal from the FSK modulator 12 is frequency-converted in such a manner that a center frequency of this modulated signal becomes a desired radio frequency "fx". In other words, the frequency converter 13 frequency-converts the data to be transmitted based upon a signal having a frequency of "fx" equal to an oscillation frequency of a reference local oscillator. In a digital system, there are many possibilities that a carrier wave produced by a frequency synthesizer circuit is modulated by employing a quadrature modulator so as to convert a frequency of data to be transmitted into a radio frequency.

Figure 2:
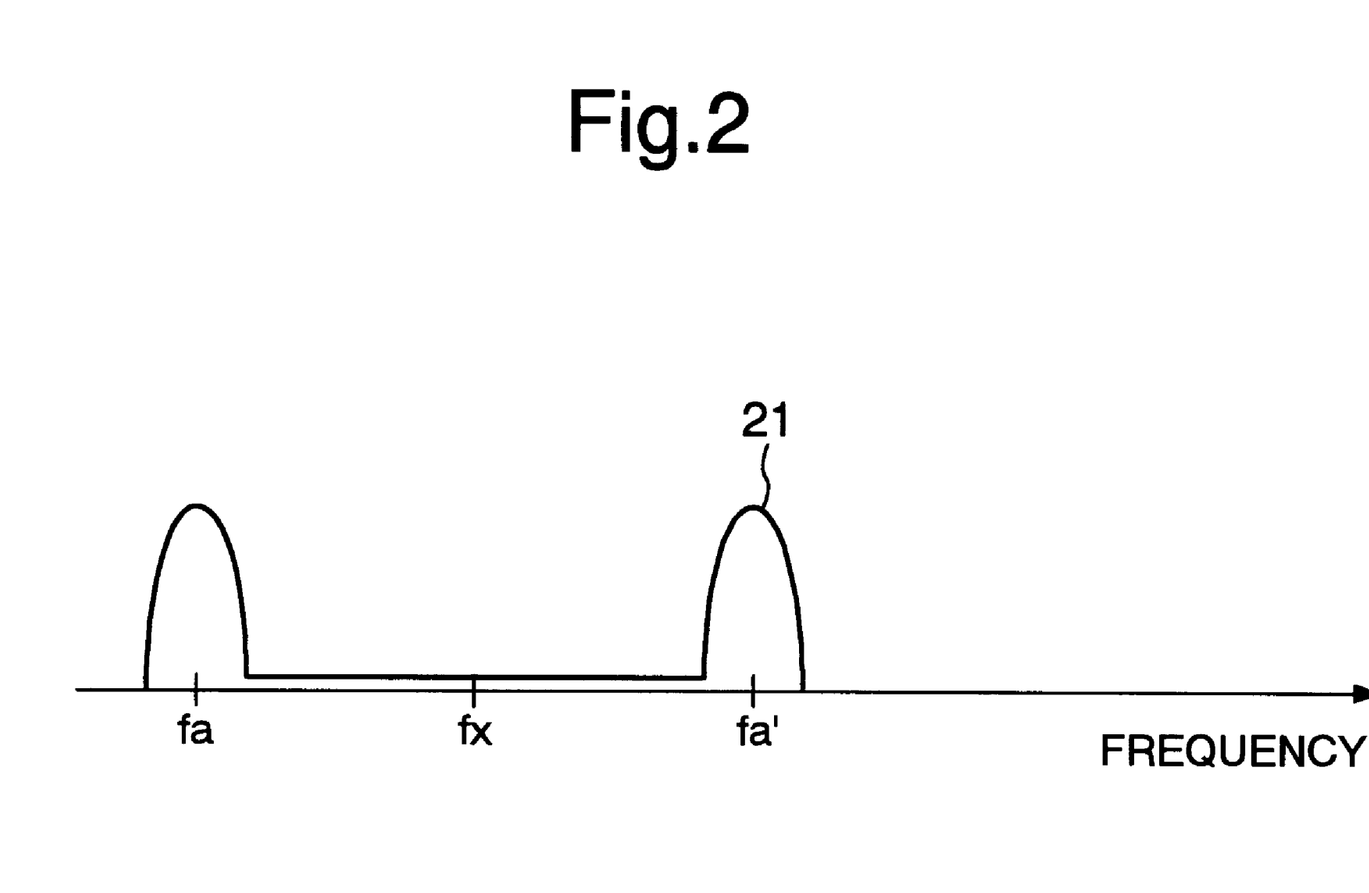
FIG. 2 is a power spectrum in the case that a channel allocating method of the present invention is used.

As indicated in FIG. 2, a frequency-converted signal 21 becomes a power spectrum having peaks in the vicinity of the carrier wave frequencies fa and fa'.

In the FDMA system, when a plurality of radio communications are performed in the same area at the same time, the radio frequencies converted by the frequency converter 13 are set to have different values with respect to the radio channels used by the respective communications. The radio frequencies of the respective channels are allocated on the frequency axis in such a manner that these radio frequencies have intervals by which no interference is given to other channels. At this time, a carrier wave frequency of another channel can be allocated between carrier wave frequencies fa and fa' of a certain channel. A total number of carrier wave frequencies of other channels which can be allocated between the carrier wave frequencies fa and fa' may be increased when a maximum frequency shift by an FSK modulation is larger. The power of the signal which has been frequency-converted so as to be arranged in the above described channel allocation is amplified by the amplifier 14 to become necessary power enough for transmission, and then the amplified frequency-converted signal is sent out to the radio transmission path.

Next, the channel allocating method on the frequency axis will now be explained with reference to a specific example It is now assumed that a frequency band (range) given to the entire system is 30 kHz, and an interval (will be referred to as a "channel interval" hereinafter) between carrier wave frequencies of another adjoining channel is set to be 5 kHz. At this time, assuming now that the maximum frequency shift by the FSK modulation is 15 kHz, each one carrier wave frequency of other two channels can be allocated between carrier frequencies of a certain channel In this example, assuming now that the carrier frequencies are fa and fa'; fb and fb'; and also fc and fc', fa=10 kHz, fb=15 kHz, fc=20 kHz, fa'=25 kHz, fb'=30 kHz, and fc'=35 kHz, so that three channels can be multiplexed.

Figure 3:
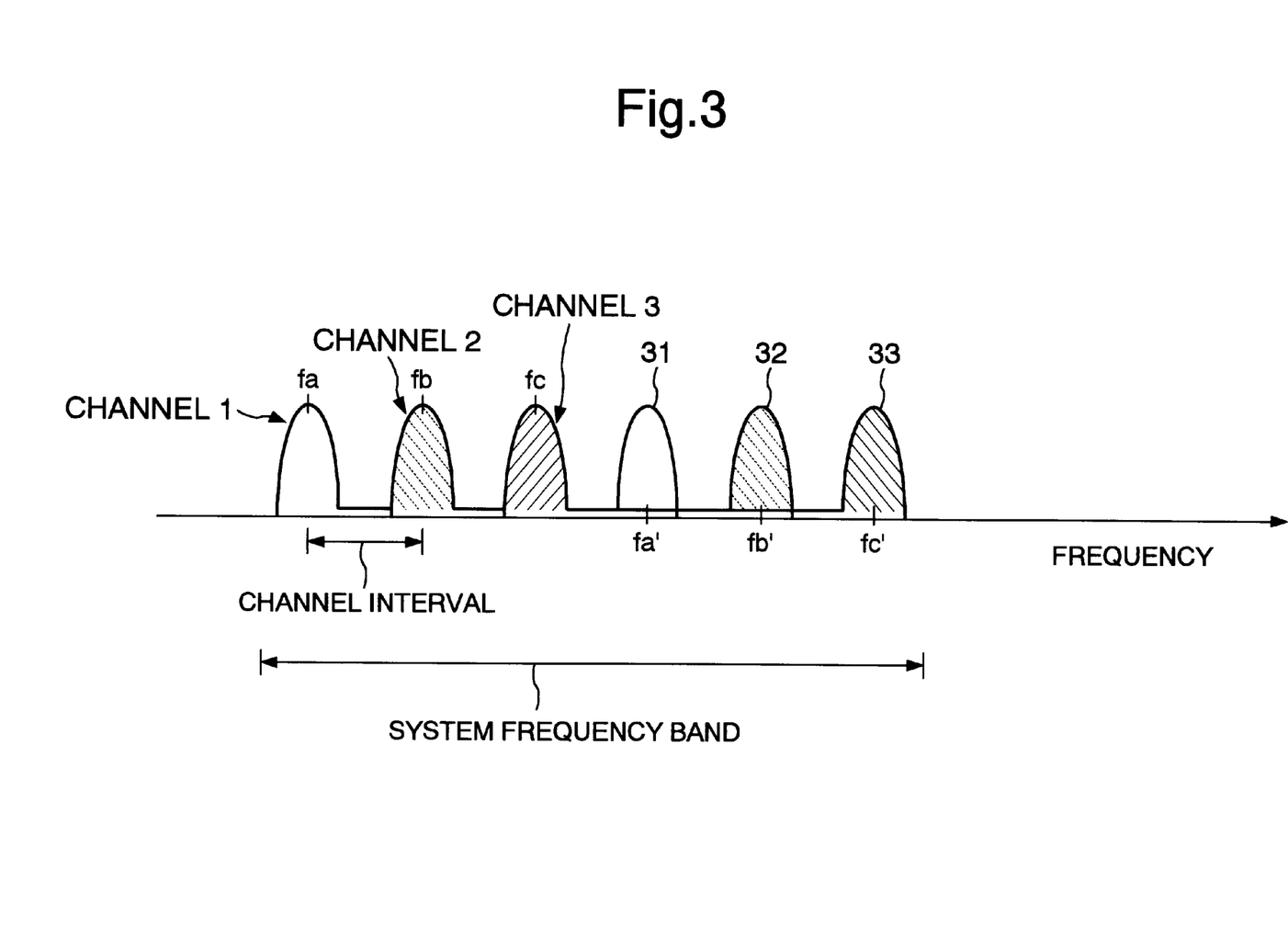
FIG. 3 is another power spectrum in the case that a channel allocating method of the present invention is used.

FIG. 3 represents a power spectrum in the case that the channel allocating method of this embodiment is employed. In this drawing, a power spectrum 31 indicates a channel 1; a power spectrum 32 denotes a channel 2; and a power spectrum 33 represents a channel 3. Assuming now that the carrier frequencies of the channel 1 are fa and fa'; the carrier wave frequencies of the channel 2 are fb and fb'; and the carrier wave frequencies of the channel 3 are fc and fc', a relationship among these carrier wave frequencies is given as follows:

fa <fb<fc <fa'<fb' <fc'

On the other hand, when the conventional channel allocating method is employed, a power spectrum as shown in FIG. 12 is given. A total number of multiplexed channels is only 1 channel in the case that the conventional channel allocating method is employed under the same conditions (namely, frequency band is 30 kHz, channel interval is 5 kHz, and maximum frequency shift is 15 kHz, given to system).

As apparent from the above comparison, the channel allocating method according to this embodiment owns such an advantage that a total number of channels available for multiplexing within the given frequency band is larger than that of the conventional channel allocating method, resulting in an effective utilization of frequencies.

2. Second Embodiment

Figure 4:
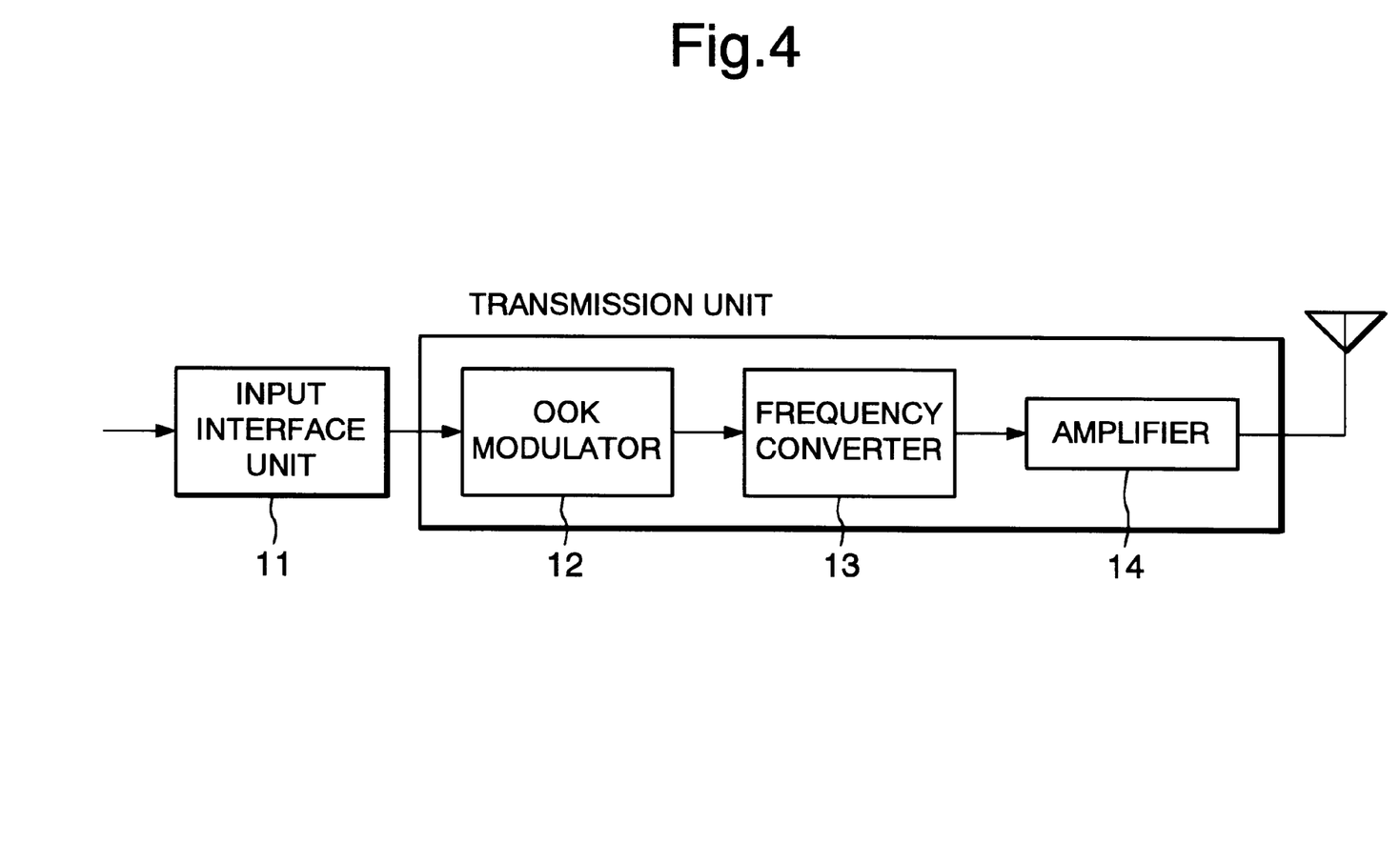
FIG. 4 is a block diagram representing an arrangement of a transmission apparatus according to a second embodiment of the present invention.

Referring now to drawings, a second embodiment of the present invention will be explained. FIG. 4 is a functional block diagram for showing a transmission apparatus according to the second embodiment of the present invention.

Referring now to FIG. 4, this second embodiment owns a different point from the first embodiment, namely an On/Off keying (will be referred to as an "OOK" hereinafter) modulator is employed instead of the FSK modulator 12. In this OOK modulator 12, a carrier wave is ON/OFF-modulated in accordance with the content of data ("1" or "0") input from the input interface unit 11.

Next, operations of the second embodiment will be described with reference to FIG. 4. Data to be transmitted is input from the input interface unit 11 to the OOK modulator 41. In response o contents of these data ("0" or "1"), the OOK modulator 41 ON/OFF-modulates the carrier wave. In this embodiment, a 2-value OOK case will now be explained in which two carrier waves "fa" and "fa'" per 1 channel are employed. Two carrier wave oscillators are provided for each of two carrier waves, and active elements of these carrier wave oscillators are provided as a switch in an inoperative bias supply path and an operative bias supply path. When the data to be transmitted input into the OOK modulator 41 is "0", the carrier wave frequency fa is set to ON and the carrier wave frequency fa' is set to OFF. Conversely, when the data to be transmitted is "1", the carrier wave frequency fa is set to OFF and the carrier wave frequency fa' is set to ON As a result, similar to the above-described first embodiment, a power spectrum of the modulated signal owns peaks in the vicinity of the two carrier wave frequencies fa and fa' The values of the carrier wave frequencies fa and fa' are set in such a manner that a difference between these frequencies, namely a maximum frequency shift becomes sufficiently large, and thus interference occurred between these carrier waves is reduced.

Also, similarly to the first embodiment, a carrier wave frequency of another channel can be allocated between carrier wave frequencies fa and fa' of a certain channel. A total number of carrier wave frequencies of other channels which can be allocated between the carrier wave frequencies fa and fa' may be increased when a maximum frequency shift by the OOK modulation is larger.

Next, the frequency modulator 13 frequency-converts the modulated signal output from the OOK modulator 41 in such a manner that a central frequency of the modulated signal output from the OOK modulator 41 becomes a desired radio frequency fx. The frequency-converted signal, in other words, the power of the signal output from the frequency converter 13 having the peaks in the vicinity of the carrier wave frequencies fa and fa' is amplified by the amplifier 14 up to desired level for transmission, and then the power-amplified signal is sent out to the radio transmission path.

3. Third Embodiment

Figure 5:
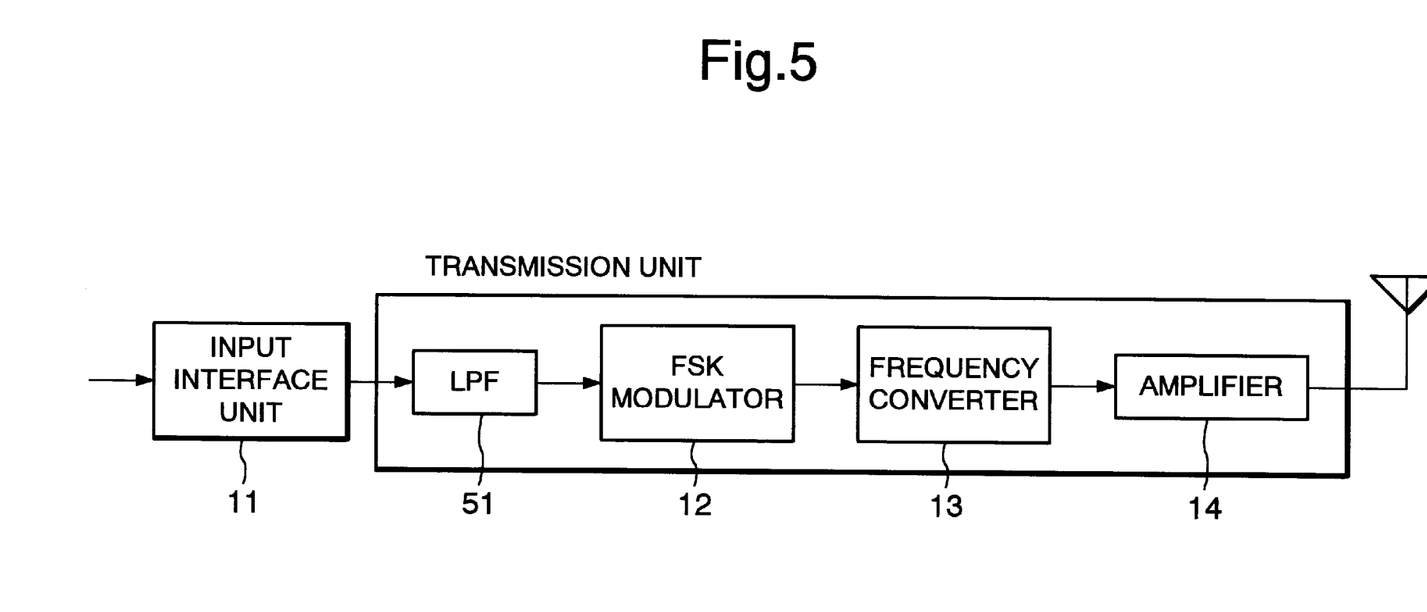
FIG. 5 is a block diagram indicating an arrangement of a transmission apparatus according to a third embodiment of the present invention.
Figure 6:
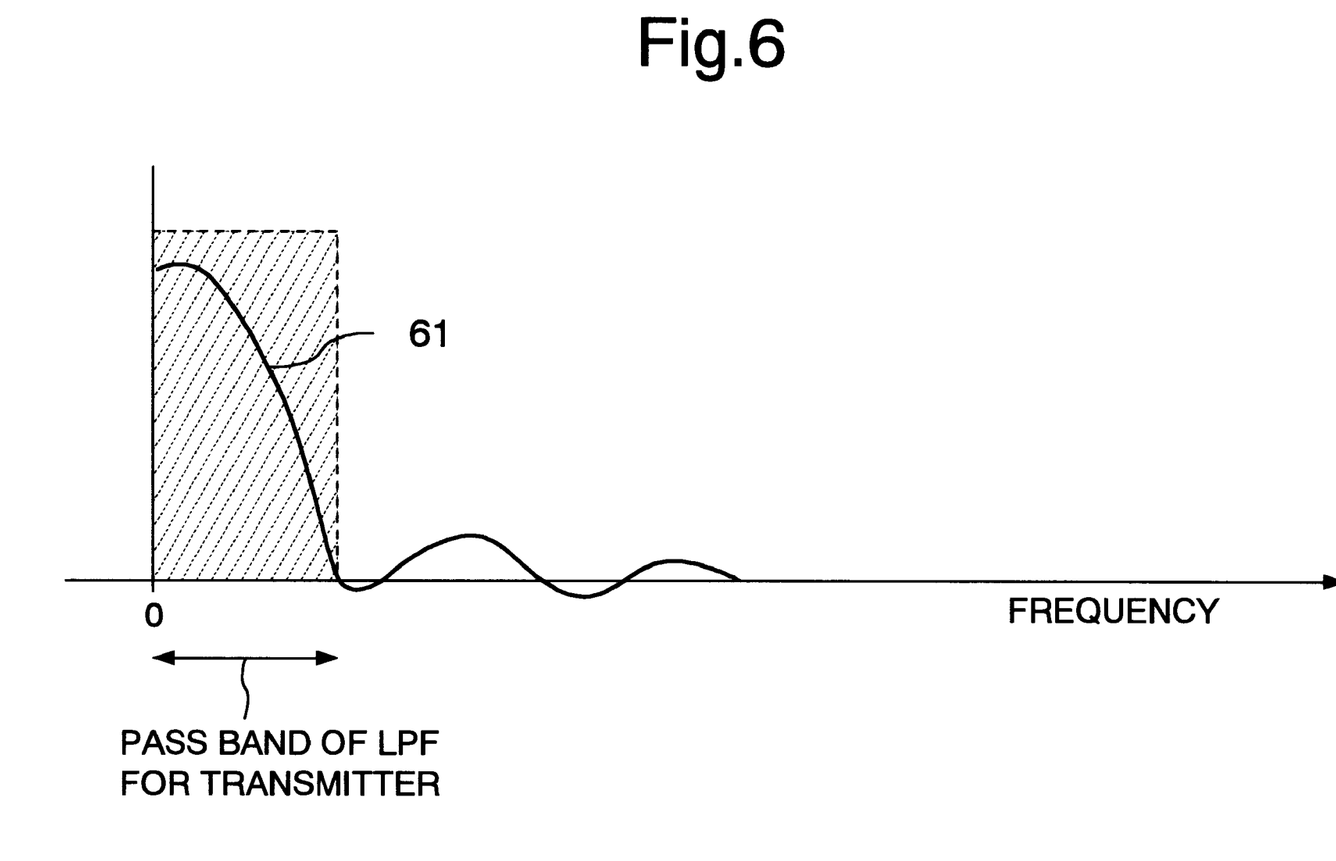
FIG. 6 is a power spectrum in the case that a channel allocating method of the present invention is employed.

Further another embodiment of the present invention will be explained. FIG. 5 is a functional block diagram for showing a transmission apparatus according to the third embodiment of the present invention. Referring now to FIG. 5, this third embodiment owns a different point from the first and second embodiments, namely an employment of an LPF (Low Pass Filter) 51. In this LPF 51, a band limitation of data to be transmitted is carried out next, with reference to FIG. 5, operations of the third embodiment will now be described. The data to be transmitted is input to the LPF 51 via the input interface unit 11. Since the data output from the input interface unit 11 is a pulse stream of "0" and "1", a power spectrum thereof owns such a broad shape spread in a wide band as indicated by reference numeral 61 in FIG. 6. This spread of the power spectrum may produce interference power to other channels, which may cause a speech quality to be deteriorated. Under such a circumstance, the band limitation is carried out by the LPF 51 in order to suppress the spread in the power spectrum.

In particular, in the case that a plurality of channels are multiplexed by employing the above-described channel allocating method, since the channel interval can be narrowed by executing the band limitation, there is such an effect that a total number of channels available for multiplexing can be increased. The hand-limited signal is input into the FSK modulator 12 so as to execute the FSK modulation. It should be noted that the operation of this FSK modulator 12 and other operations for frequency conversion, power amplifier and signal transmission through antenna are similar to those of the first embodiment. It should also be noted that the LPF 51 according to this third embodiment may be provided not only in front of the FSK modulator 12 in the first embodiment, but also in front of the OOK modulator 41 in the second embodiment.

As previously explained, since the LPF 51 capable of limiting the frequency band is provided at the prestage of the FSK modulator 12, more carriers, each has narrow bandwidth, can be multiplexed between the carrier wave frequencies fa and fa'. On the other hand, when total number of other carrier waves to be multiplexed put the same and the frequency shift degree is increased, it is possible to obtain high S/N ratio signal after demodulation.

4. Fourth Embodiment

Figure 7:
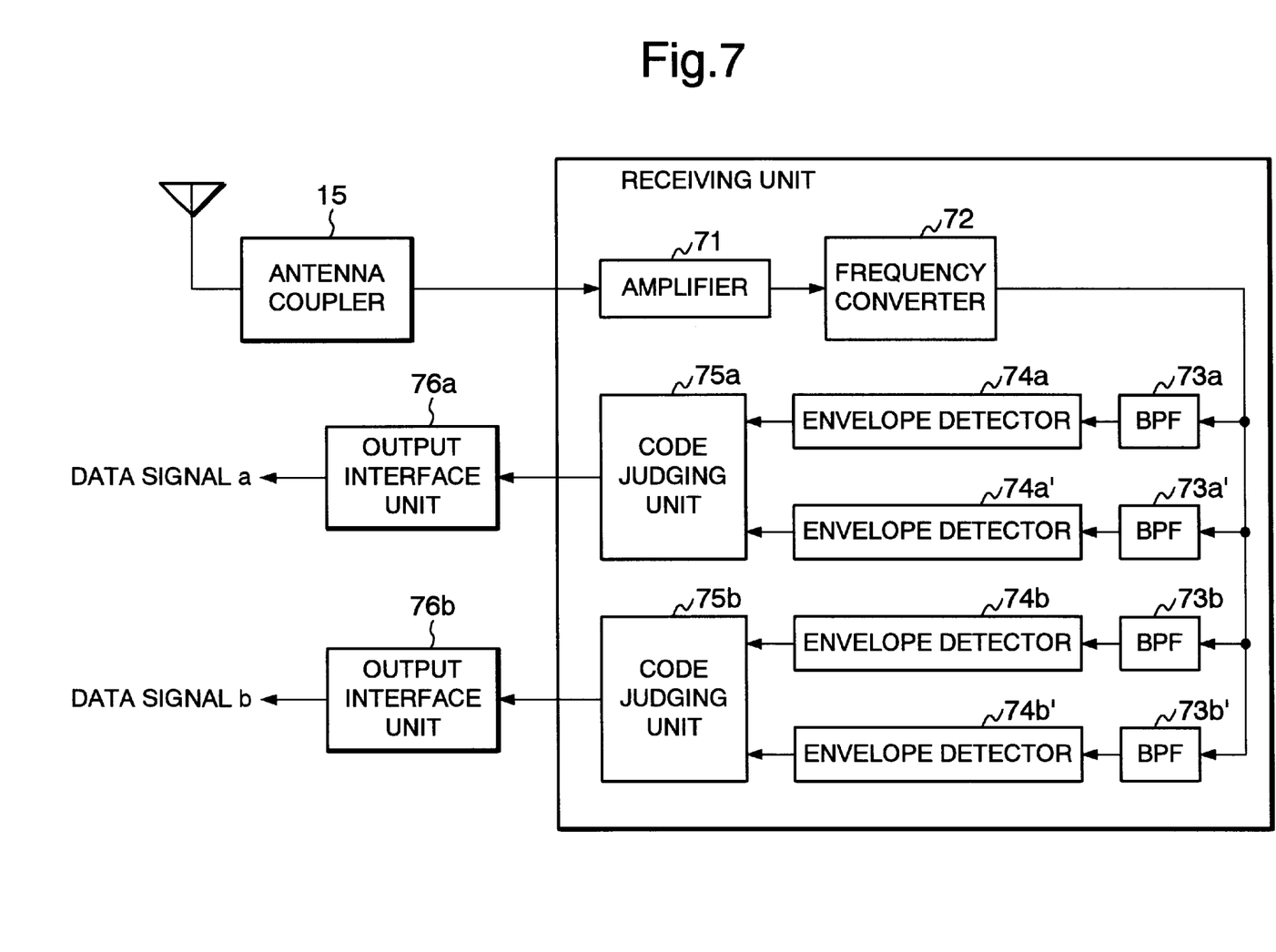
FIG. 7 is a block diagram indicating an arrangement of a receiving apparatus according to a fourth embodiment of the present invention.

Next, a fourth embodiment of the present invention will be explained with reference to drawings. FIG. 7 is a functional block diagram for representing a receiver apparatus provided in a base station according to the fourth embodiment of the present invention. This receiver apparatus is applied as a receiver for receiving radio signals transmitted by the transmission apparatus according to the above-described first to third embodiments.

Referring to FIG. 7, this embodiment is arranged by an antenna coupler 13, an amplifier 71, a frequency converter 72, a BPF (Band Pass Filter) 73, an envelope detector 74, a code judging unit 75, and an output interface unit 76.

Next, operations of the fourth embodiment will be described with reference to FIG. 7. It should be understood that the receiver apparatus in this fourth embodiment is such a receiver.apparatus for receiving radio signals transmitted by the transmission apparatus according to the first embodiment.

Radio signals from mobile terminals, and also radio signals transmitted by other base stations are received by an antenna of this receiver apparatus, and input to the receiving unit for signal demodulation.

The radio signals input to the receiving unit via the antenna coupler 15 is firstly supplied to the amplifier 71. In the amplifier 71, power of received signal is amplified in a high frequency band. In the frequency converter 72, the signal in the radio frequency band (range) is converted into a signal in an intermediate frequency band by employing a local frequency produced by a frequency synthesizer circuit (not shown). The frequency-converted signal is processed by BPFs 73a, 73a', 73b, and 73b' so as to limit the frequency band thereof, so that the noise power superimposed on this frequency-converted signal along the transmission path can be eliminated. A total number of these BPFs 73 is equal to a total number of carrier wave frequencies used in the FSK modulator 12, and these BPFs 73 limit the frequency bands of the respective carrier waves. The respective frequency components filtered by the BPFs 73 are envelope-detected by the envelope detector 74. The envelope-detected outputs from paired envelope detectors 74a and 74a'; and 74b and 74b' are input to the code judging units 75a and 75b.

In this manner, the transmitted data are demodulated and then the demodulated data are output via the respective output interfaces 76a and 76b.

Figure 8:
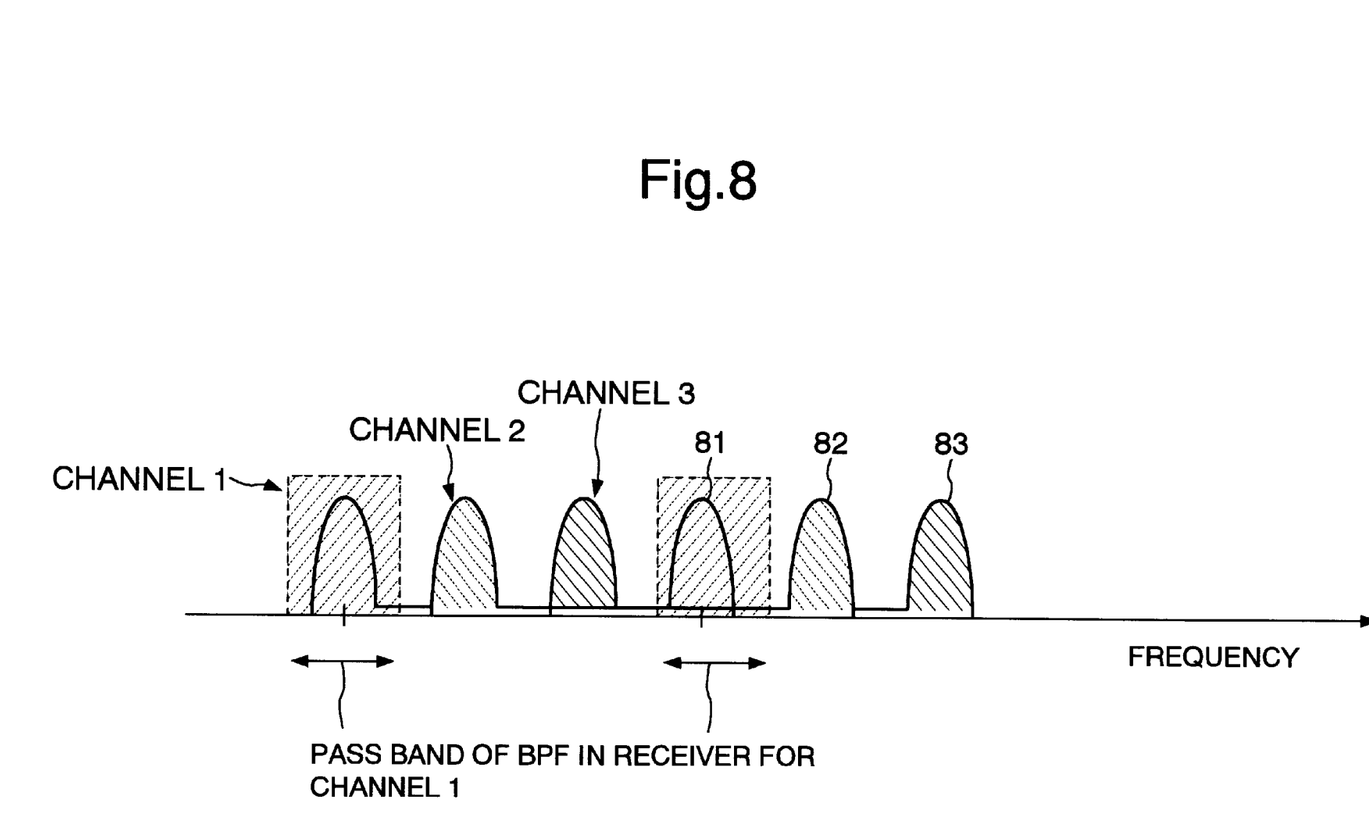
FIG. 8 is a power spectrum in the case that a channel allocating method of the present invention is employed.

FIG. 8 represents a channel allocation received by this receiver apparatus, corresponding to the transmission channels described and indicated in FIG. 3.

Also, in FIG. 8, the outputs of the frequency converter 72 own the respective bands of the carrier wave frequencies fa and fa' of the channel 1 (81); of the carrier wave frequencies fb and fb' of the channel 2 (82); and of the carrier wave frequencies fc and fc' of the channel 3 (83). The frequency band limitation executed every carrier wave is equal to, in particular, the above-described channel allocating method. When the FDMA multiplex is carried out, there is an effect that the interference power caused by other channels can be eliminated so as to improve the speech quality. The band-limited signals are input to the envelope detectors 74 connected to the respective BPFs 73. The code judging device 75 compares the magnitudes of the output values from the envelope detectors 74 so as to judge as to whether or not the transmitted data from the transmission apparatus is equal to "0", or "1". Assuming now that the output of the envelope detector 74 for the carrier wave frequency "fa" is "Va" and the output of the envelope detector 74 for the carrier wave frequency "fa'" is "Va'", when the data of "0" is transmitted, Va≧Va', whereas when the data of "1" is transmitted, Va<Va'. The data output from the code judging device 75 is sent via the output interface units 76a and 76b to the base station control apparatuses, respectively.

It should also be noted that although FIG. 7 shows two channel sets of the reception arrangement block diagrams, three channel sets or more channel sets may be employed. The paired BPFs 73 and the paired envelope detectors 74 are provided appropriately in accordance with the multiplexed channels of the radio system.

5. Fifth Embodiment

Next, a fifth embodiment of the present invention will be explained. The fifth embodiment is such that in the above-explained channel allocating methods of the first to fourth embodiments, setting of the channel interval is controlled by a value of a maximum Doppler frequency.

In general, since a mobile terminal used in an urban area is moving around several places and receiving a large number of electromagnetic waves from various directions received via different transmission paths, the Doppler effect occurs in the received waves, so that a carrier wave frequency is offset along one direction. The faster the moving speed is, the larger this Doppler effect becomes. As a result, a power spectrum of the received waves is spread.

As a consequence, the channel allocating method according to the present invention is applied to reduce interference caused by the other channel by allocating each channel interval being set to be a large value for a system where a maximum Doppler frequency is high. Also, the channel allocating method of the present invention is applied to increase a total number of multiplexing channels by allocating each channel interval being set to be a small value for a system where a maximum Doppler frequency is low.

Assuming now that each channel having a data transmission speed of R bps is multiplexed and the Doppler frequency at this time is "fd", in such a case that the channel interval during the multiplexing operation becomes 2×(R+fd)[Hz]. In case that the bandwidth of the carrier frequency fa is 5 KHz and the Doppler frequency fd is on the order of 1.2 kHz, the bandwidth becomes to on the order of 6.2 kHz when considering the Doppler frequency.

Also, assuming now that the data transfer speed is 1 Kbps and the radio frequency band is 2 GHz, and also the moving speed of the mobile station is 100 Km/h, the expected maximum Doppler frequency fd becomes 185.2 Hz. As a result, the channel interval during the frequency multiplexing operation becomes 2×(1000+185.2)=2370.4 Hz. If the channel interval is set to be higher than, or equal to 2.37 KHz in this case, then the problem about the other channel interference caused by the Doppler effect can be solved.

As previously described, since the channel interval is set to be such a proper value suitable to the characteristic of the transmission path, the frequency utilizing efficiency can be improved while a preselected speech quality can be maintained even under fading environment.

6. Sixth Embodiment

Figure 9:
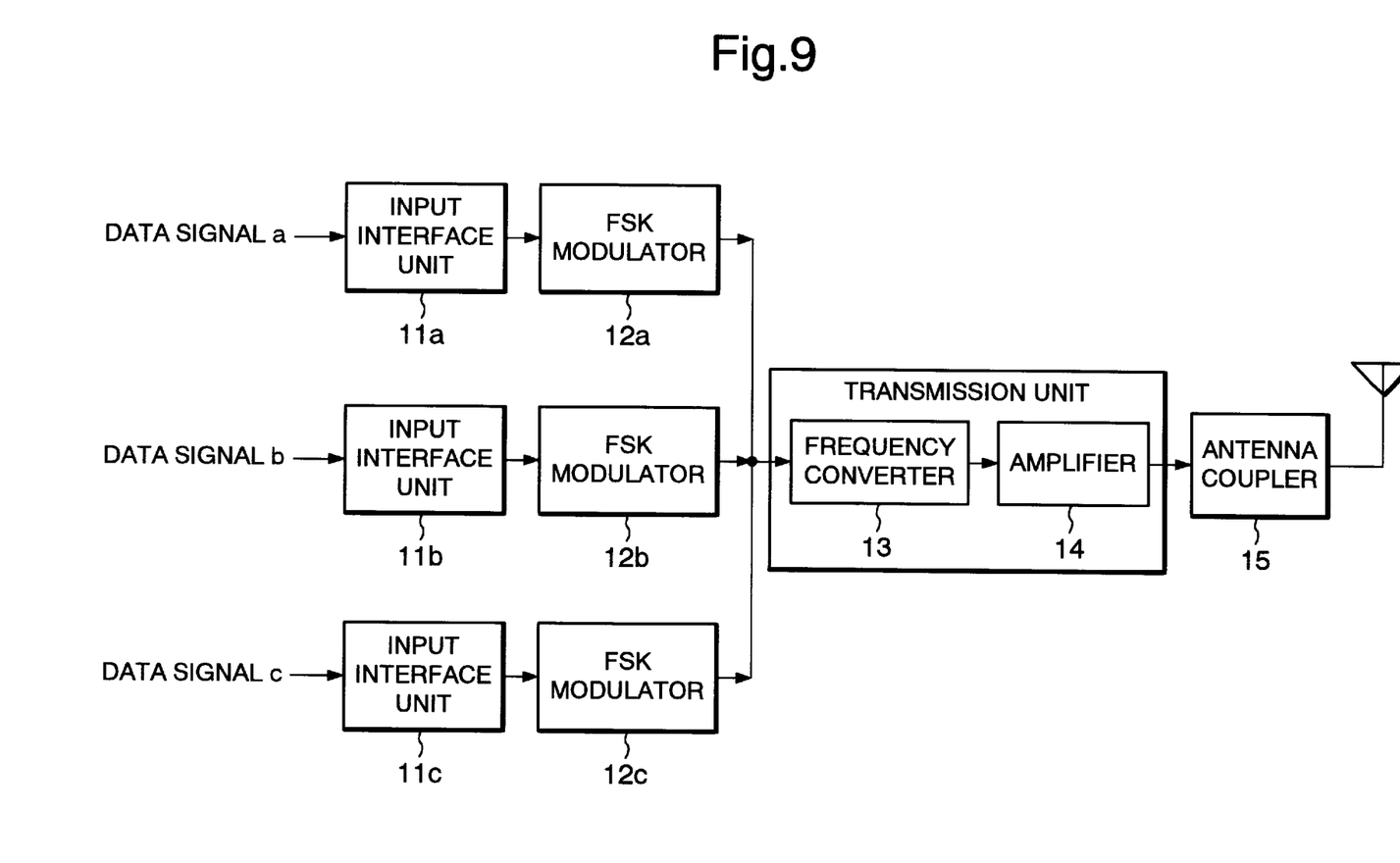
FIG. 9 is a block diagram representing an arrangement of a transmission apparatus according to a sixth embodiment of the present invert ion.

FIG. 9 is a functional block diagram for showing a transmission apparatus used in the base station according to a sixth embodiment of the present invention Referring to FIG. 9, this transmission apparatus is arranged by input interface units 11a to 11c; FSK modulators 12a to 12c; a frequency converter 13, an amplifier 14, and an antenna coupler 15 in correspondence with data signals "a", "b", and "c".

A plurality of data to be transmitted "a" to "c" sent from a base station control apparatus (not shown) are input to the FSK modulators 12a to 12c via the input interface units 11a to 11c. In the FSK modulators 12a to 12c, while in response to the content of data ("1" or "0"), carrier wave frequencies of the respective data are shifted only by a frequency corresponding to a multiplexing degree, the carrier waves are frequency-modulated. The frequencies of the carrier waves are set in such a manner that a maximum frequency shift becomes a sufficiently large value, and power spectra of the carrier waves are separated from each other as far as possible in order that interference occurred between the carrier waves is reduced. In the frequency converter 13, the frequency conversion is carried out from the base band signal into a radio frequency band signal. In this frequency conversion into the radio frequency band, the frequencies of the respective channels are set in such a manner that a carrier wave frequency of another channel is allocated between carrier wave frequencies of a certain channel. By employing this channel allocating method, a larger number of channels can be multiplexed within the given frequency band. The power of the frequency-converted signal is amplified in the amplifier 14, and then the power-amplified signal is supplied to the radio transmission path for radio transmission via the antenna coupler 15.

Referring to FIG. 9, operations of the sixth embodiment of the present invention will be described in detail.

The data from the base station control apparatus is input to the FSK modulators 12a to 12c via the input interface units 11a to 11c. As an example, a description is made of such an FSK case that two carrier wave frequencies are used.

In the FSK, the respective carrier frequencies are shifted only by the frequency corresponding to the multiplexing degree in response to the input data, so that the carrier waves are frequency-modulated. For instance, since a VCO (voltage-controlled oscillator) whose oscillation frequency is varied in response to an applied voltage is employed, carrier wave frequencies "fa" and "fa'" corresponding to the input data ("0" or "1") may be obtained by the FSK modulator 12a, carrier wave frequencies fb and fb' corresponding thereto may be obtained by the FSK modulator 12b, and carrier wave frequencies fc and fc' corresponding thereto may be obtained by the FSK modulator 12c. The values of the carrier wave frequencies "fa" and "fa'"; "fb" and "fb'"; and "fc" and "fc'" are set in such a manner that a difference between these frequencies, namely a maximum frequency shift can become sufficiently large.

In the case that the maximum frequency shift is large, the power spectrum of the modulated signal owns such a shape that peeks appear in the vicinity of the carrier frequencies fa and fa'; fb and fb'; and fc and fc'. The larger this maximum frequency shift is, the farther the frequency difference between two peaks is separated, so that the interference occurred between the carrier waves can be lowered. The FSK modulators 12a to 12c produces the modulated signals of predetermined carrier frequencies fa and fa'; fb and fb'; and fc and fc' based upon the data of "0" or "1" sent from the input interface units 11a to 11c.

In the frequency converter 13, when only the FSK modulator 12a is employed, the modulated signal output from the FSK modulator 12a is frequency-converted in such a manner that a center frequency of this modulated signal becomes a desired radio frequency "fx". In a digital system, there are many possibilities that a carrier wave produced by a frequency synthesizer circuit is modulated by employing a quadrature modulator so as to convert a frequency of data to be transmitted into a radio frequency. As indicated in FIG. 2, a frequency-converted signal becomes a power spectrum having peaks in the vicinity of the carrier wave frequencies f1 and f1'.

Next, the channel allocating method on the frequency axis will be explained with reference to a specific example. It is now assumed that a maximum frequency shift in the FSK modulation is selected to be 15 kHz, and an interval (will be referred to as a "channel interval" hereinafter) between carrier wave frequencies of another adjoining channel is set to be 5 kHz. At this time, one carrier wave frequencies of two channels can be allocated between carrier frequencies of a certain channel. In this example, assuming now that the carrier frequencies are fa and fa'; fb and fb'; and also fc and fc', while using fa as a reference, fb=5 kHz, fc=10 kHz, fa'=15 kHz, fb'=20 kHz, and fc'=25 kHz. As a consequence, a number of channels available for multiplexing, in the case that the frequency band given to the entire system is 30 kHz becomes 3 channels.

Fig 3 represents a power spectrum in the case that the channel allocating method of this embodiment is employed, as previously explained in the first embodiment In this drawing, a power spectrum 31 indicates a channel 1; a power spectrum 32 denotes a channel 2; and a power spectrum 33 represents a channel 3. Assuming now that the carrier wave frequencies of the channel 1 are fa and fa'; the carrier wave frequencies of the channel 2 are fb and fb'; and the carrier wave frequencies of the channel 3 are fc and fc', a relationship among these carrier frequencies is given as follows;

fa<fb<fc<fa'<fb'<fc'

As apparent from the comparison, the channel allocating method according to this embodiment owns such an advantage that a total number of channels for multiplexing within the given frequency band is larger than that of the conventional channel allocating method, resulting in an effective utilization of frequencies.

7. Seventh Embodiment

Figure 10:
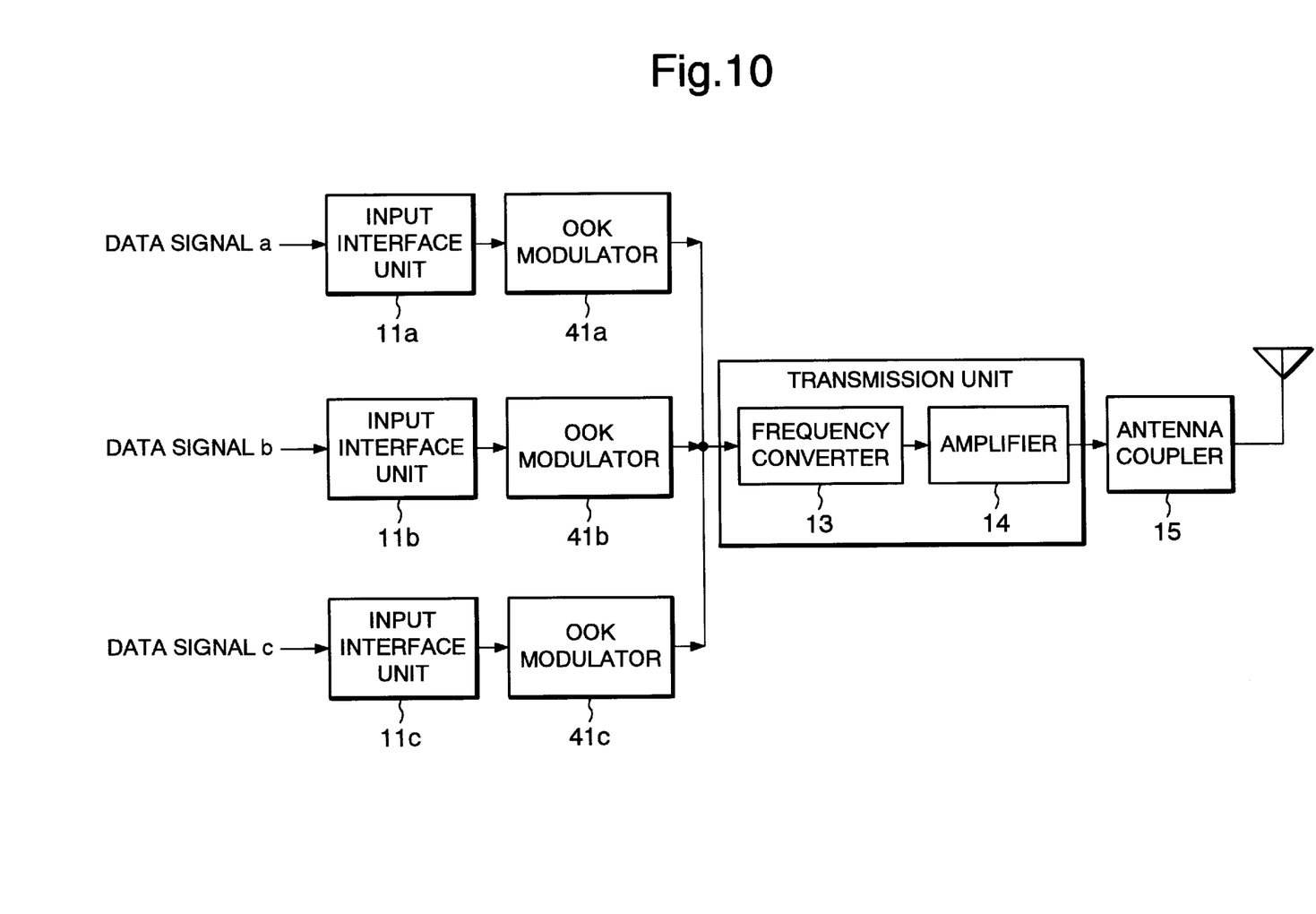
FIG. 10 is a block diagram indicating an arrangement of a transmission apparatus according to a seventh embodiment of the present invention.

Referring to drawings, another embodiment of the present invention will be explained. FIG. 10 is a functional block diagram for showing a transmission apparatus used in a base station according to the seventh embodiment of the present invention.

Referring to FIG. 10, this seventh embodiment owns a different point from the first embodiment, namely an On/Off keying (will be referred to as an "OOK" hereinafter) modulator 41 is employed instead of the FSK modulator 12. In this OOK modulator 12, a carrier wave is ON/OFF-modulated in response to the content of data ("1" or "0") input via the input interface unit 11 from a base station control apparatus.

Next, operations of the seventh embodiment will be described with reference to FIG. 10. Data to be transmitted is transferred from a base station control apparatus (not shown) and input to the OOK modulator 41 via the input interface unit 11. In response to contents of these data ("0" or "1"), the OOK modulator 41 ON/OFF-modulates the carrier wave. In this embodiment, a 2-value OOK case will now be explained in which two carrier waves "fa" and "fa'" per 1 channel are employed.

Two carrier wave oscillators are provided for each of two carrier waves, and active elements of these carrier wave oscillators are provided as a switch in an inoperative bias supply path and an operative bias supply path. When the data to be transmitted input into the OOK modulator 41 is "0", the carrier wave frequency fa is set to ON and the carrier wave frequency fa' is set to OFF. Conversely, when the data to be transmitted is "1", the carrier wave frequency fa is set to OFF and the carrier wave frequency fa' is set to ON. As a result, similar to the above-described first embodiment, a power spectrum of the modulated signal owns peaks in the vicinity of the two carrier wave frequencies fa and fa' The values of the carrier wave frequencies fa and fa' are set in such a manner that a difference between these frequencies, namely a maximum frequency shift becomes sufficiently large, and thus interference occurred between these carrier waves is reduced.

Also, similarly to the sixth embodiment, a carrier wave frequency of another channel can be allocated between carrier wave frequencies fa and fat of a certain channel. A total number of carrier wave frequencies of other channels which can be allocated between the carrier wave frequencies fa and fa' may be increased when a maximum frequency shift by the OOK modulation is larger.

Next, the frequency modulator 13 frequency-converts the modulated signal output from the OOK modulator 41 in such a manner that a central frequency of the modulated signal output from the OOK modulator 41 becomes a desired radio frequency fx. As shown in FIG. 2 described above, the frequency-converted signal, in other words, the power of the signal output from the frequency converter 13 having the peaks in the vicinity of the carrier wave frequencies fa and fa' is amplified by the amplifier 14 up to desired level for transmission, and then the power-amplified signal is sent out to the radio transmission path.

8. Eighth Embodiment

Figure 11:
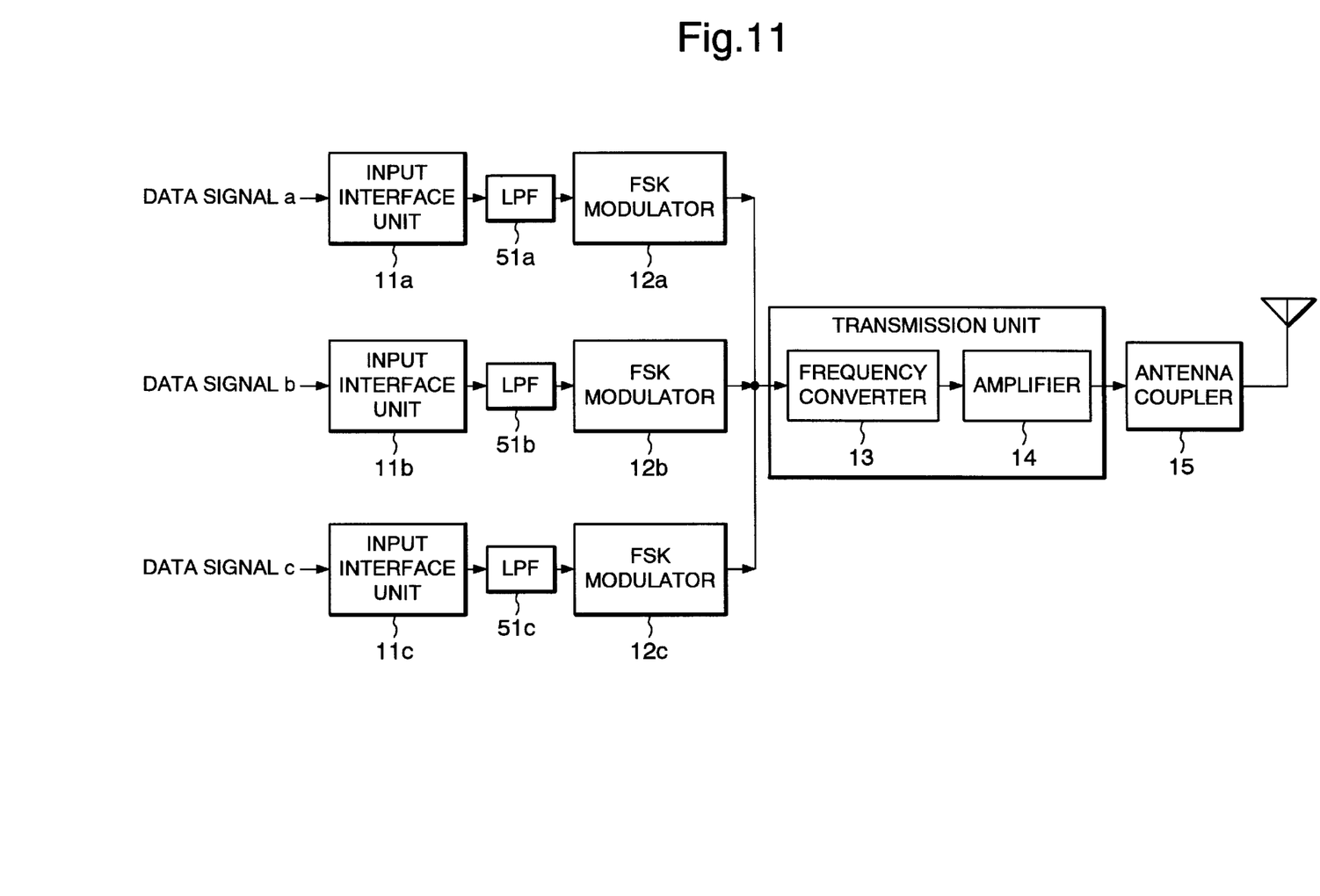
FIG. 11 is a block diagram indicating an arrangement of a transmission apparatus according to an eighth embodiment of the present invention.

Referring to drawings, a further embodiment of the present invention will be explained. FIG. 11 is a functional block diagram for showing a transmission apparatus used in a base station according to the eighth embodiment of the present invention.

Referring now to FIG. 11, this eighth embodiment owns a different point from the sixth and seventh embodiments, namely an employment of an LPF 51. In this LPF 51, a band limitation of data to be transmitted is carried out.

Next, with reference to FIG. 11, operations of the eighth embodiment will be described. The data to be transmitted sent from a base station control apparatus (not shown) is input to the LFP 51 via the input interface unit 11. Since the data to be transmitted output from the input interface unit 11 is a pulse stream of "0" and "1", a power spectrum thereof owns such a broad shape spread in a wide band as indicated by reference numeral 61 in FIG. 6. This spread of the power spectrum may produce interference power to other channels, which may cause a speech quality to be deteriorated. Under such a circumstance, the frequency band limitation is carried out by the LPF 51 in order to suppress the spread in the power spectrum.

In particular, in the case that a plurality of channels are multiplexed by employing the above-described channel allocating method, since the channel interval can be narrowed by executing the frequency band limitation, there is such an effect that a total number of channels for multiplexing can be increased. The band-limited signal is supplied to the FSK modulator 12 so as to execute the FSK modulation. It should be noted that the operation of this FSK modulator 12 and other operations for frequency conversion, power amplifier and signal transmission through antenna are similar to those of the first embodiment. It should also be noted that the LPF 51 according to this third embodiment may be provided not only in front of the FSK modulator 12 in the first embodiment, but also in front of the OOK modulator 41 in the sixth embodiment. It should also be noted that the LPF 51 according to this eighth embodiment may be provided not only in front of the FSK modulator 12 in the sixth embodiment, but also in front of the OOK modulator 14 in the seventh embodiment As previously explained, since the LPF 51 capable of limiting the frequency band is provided at the prestage of the FSK modulator 12, more carriers, each has narrow bandwidth, can be multiplexed between the carrier wave frequencies fa and fa'. On the other hand, when total number of other carrier waves to be multiplexed put the same and the frequency shift degree is increased, it is possible to obtain high S/N ratio signal after demodulation.

It should be understood that the arrangement of the reception unit shown in the above-explained fourth embodiment and the transmission unit indicated in the above-described sixth to eighth embodiments can be provided in the base station for communicating with a plurality of mobile stations by using plural sorts of carrier wave frequencies in the radio communication system employing the FDMA system as a channel multiplexing system.

In accordance with the present invention, since the maximum frequency shifts in the FSK modulation and the OOK modulation are set to be large values and also the radio carrier wave frequency of another channel can be allocated between the radio carrier wave frequencies of a certain channel, a total number of channels for multiplexing can be increased without deteriorating the speech quality within the given frequency hand. Also, the frequency utilization efficiency can be increased.

Also, the pulse-wave data signal is frequency-modulated to produce at least two sets of carrier frequencies separated from each other. These carrier frequencies are combined with another carrier frequency, and then the combined carrier frequency is frequency-converted. As a consequence, the frequency utilization efficiency can be extremely increased.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A channel allocating method for a frequency division multiple access (FDMA) system which uses FSK (Frequency shift Keying) modulation, said method comprising steps of:

allocating a maximum frequency shift value in said FSK modulation for data to be transmitted for each of a plurality of channels of said FDMA system; and allocating a carrier wave frequency of at least one of said plurality of channels to be between two carrier wave frequencies of another of said plurality of channels.

2. A channel allocating method for a frequency division multiple access (FDMA) system which uses OOK (On/Off Keying) modulation, said method comprising steps of:

allocating a maximum frequency shift value in said OOK modulation for data to be transmitted for each of a plurality of channels of said FDMA system; and allocating a carrier wave frequency of at least one of said plurality of channels to be between two carrier wave frequencies of another of said plurality of channels.

3. A transmission apparatus for a frequency division multiple access (FDMA) system which uses FSK (Frequency shift Keying) modulation, said transmission apparatus comprising:

a signal modulation circuit for allocating a maximum frequency shift value in the FSK modulation for data to be transmitted for each of a plurality of channels of said FDMA system; and a channel allocating circuit for allocating a carrier wave frequency of at least one of said plurality of channels to be between two carrier wave frequencies of another of said plurality of channels.

4. A transmission apparatus for a frequency division multiple access (FDMA) system which uses FSK (Frequency shift Keying) modulation, said transmission apparatus comprising:

a plurality of FSK modulators, each for allocating a maximum frequency shift value in the FSK modulation for data to be transmitted for a respective one of a plurality of channels of said FDMA system; and a frequency converter for converting modulated signals output from each of said FSK modulators to carrier wave frequencies, and for combining said frequency-converted signals by allocating a carrier wave frequency of at least one of said plurality of channels to be between two carrier wave frequencies of another of said plurality of channels; and an amplifier for amplifying the power of signal output from said frequency converter.

5. A transmission apparatus as claimed in claim 4, wherein, said transmission apparatus further comprising an LPF (Low Pass Filter) for limiting frequency bands of input signals to each FSK modulator.

6. A transmission apparatus for a frequency division multiple access (FDMA) system which uses OOK (On/Off Keying) modulation, said transmission apparatus comprising:

a signal modulation circuit for allocating a maximum frequency shift value in the OOK modulation for data to be transmitted for each of a plurality of channels of said FDMA system; and a channel allocating circuit for allocating a carrier wave frequency of at least one of said plurality of channels to be between two carrier wave frequencies of another of said plurality of channels.

7. A transmission apparatus for a frequency division multiple access (FDMA) system which uses OOK (On/Off Keying) modulation, said transmission apparatus comprising:

a plurality of OOK modulators, each for allocating a maximum frequency shift value in the OOK modulation for data to be transmitted for a respective one of a plurality of channels of said FDMA system; and a frequency converter for converting modulated signals output from each of said OOK modulators to carrier wave frequencies, and for combining said frequency-converted signals by allocating a carrier wave frequency of at least one of said plurality of channels to be between two carrier wave frequencies of another of said plurality of channels; and an amplifier for amplifying the power of signal output from said frequency converter.

8. A transmission apparatus as claimed in claim 7, wherein, said transmission apparatus further comprising an LPF (Low Pass Filter) for limiting frequency bands of input signals to each OOK modulator.

9. A receiver apparatus for a frequency division multiple access (FDMA) system which uses FSK (Frequency Shift Keying) modulation, said receiver apparatus comprising:

a receiving unit for receiving a combined signal in which at least one carrier wave of one of a plurality of channels of said FDMA system is allocated between two carrier wave frequencies of another of said plurality of channels;

a plurality of BPFs (Band Pass Filters) respectively provided for said plurality of channels, each of said plurality of BPFs configured to separate frequency for the respective one of said plurality of channels;

a plurality of detectors, each for detecting the data to be received in each carrier wave frequency output from a respective one of said plurality of BPFs; and a code judging device for judging codes of data detected by said plurality of detectors.

10. A receiver apparatus for a frequency division multiple access (FDMA) system which uses OOK (On/Off Keying) modulation, said receiver apparatus comprising:

a receiving unit for receiving a combined signal in which at least one carrier wave of one of a plurality of channels of said FDMA system is allocated between two carrier wave frequencies of another of said plurality of channels;

a plurality of BPFs (Band Pass Filters) respectively provided for said plurality of channels, each of said plurality of BPFs configured to separate each of more than one carrier wave frequency for the respective one of said plurality of channels;

a plurality of detectors, each for detecting the data to be received in each carrier wave frequency output from a respective one of said plurality of BPFs; and a code judging device for judging codes of data detected by said plurality of detectors.

11. A channel allocating method for a frequency division multiple access (FDMA) system which uses FSK (Frequency shift Keying) modulation, said method comprising steps of:

allocating a maximum frequency shift value in said FSK modulation for data to be transmitted for each of a plurality of channels of said FDMA system;

determining a channel interval for allocating a plurality of channels by a magnitude of a maximum Doppler frequency; and allocating a carrier wave frequency of at least one of said plurality of channels to be between two carrier wave frequencies of another of said plurality of channels.

12. A channel allocating method for a frequency division multiple access (FDMA) system which uses OOK (On/Off Keying) modulation, said method comprising steps of:

allocating a maximum frequency shift value in said OOK modulation for data to be transmitted for each of a plurality of channels of said FDMA system;

determining a channel interval for allocating a plurality of channels by a magnitude of a maximum Doppler frequency; and allocating a carrier wave frequency of at least one of said plurality of channels to be between two carrier wave frequencies of another of said plurality of channels.

* * * * *